United States Patent Office 3,527,751
Patented Sept. 8, 1970

3,527,751
PROCESS FOR THE PURIFICATION OF WATER-SOLUBLE HYDROXYALKYL CELLULOSE
John Ernest Gill, Saltcoats, Scotland, assignor to Imperial Chemical Industries Limited, London, England, a corporation of Great Britain
No Drawing. Filed Jan. 22, 1968, Ser. No. 699,351
Claims priority, application Great Britain, Feb. 16, 1967, 7,401/67
Int. Cl. C08b 11/20, 21/24
U.S. Cl. 260—232                 8 Claims

ABSTRACT OF THE DISCLOSURE

Hydroxyalkyl cellulose is purified by treating the crude material with glyoxal under acid conditions to form a water-insoluble addition compound (of the hemiacetal type).

---

This invention relates to a process for the purification of crude water-soluble hydroxyalkyl cellulose and to the production of purified hydroxyalkyl cellulose.

Water-soluble hydroxyalkyl cellulose is generally prepared by the action of alkylene oxide on cellulose in the presence of an alkali, usually sodium hydroxide. The removal of the excess alkali and the readily water-soluble salts formed in the process by the neutralisation of the alkali from the hydroxyalkyl cellulose is difficult because of the high water-solubility of the hydroxyalkyl cellulose. The reaction is usually performed on cellulose suspended in a liquid medium wherein hydroxyalkyl cellulose is insoluble and the excess alkali or its salts after neutralisation are extracted with mixtures of organic liquids with small quantities of water in which the alkali or salts dissolve and the hydroxyalkyl cellulose is substantially insoluble. The water concentration must be carefully controlled to avoid gelling the hydroxyalkyl cellulose whilst permitting sufficient solubility for removal of the alkali and salts. The process requires large quantities of organic liquids in order to achieve acceptable purity (as denoted by low ash content) and this substantially increases the cost.

Recently it has been proposed to purify crude hydroxyethyl cellulose by treating the crude material with glyoxal under acid conditions to form a water-insoluble addition compound (of the hemiacetal type) and so render the hydroxyethyl cellulose less water-soluble under acid conditions and thereafter washing the product with water at acid pH. This glyoxal treatment involved addition of glyoxal to an acidified slurry of the crude material in an organic liquid, removal of the liquid, heating of the crude glyoxal-treated hydroxyethyl cellulose in an essentially dry condition for a period to effect sufficient reaction of the hydroxyalkyl cellulose and glyoxal and finally suspending in and washing with water at an acid pH.

We have now discovered that crude hydroxyalkyl cellulose can be reacted to a sufficient degree with glyoxal to permit it to be washed free from impurities with water at acid pH by heating a slurry of the crude hydroxyalkyl cellulose in a liquid containing glyoxal. Thus in our process it is unnecessary to separate the mixture of crude hydroxyalkyl cellulose from the suspending liquid to effect sufficient reaction of the hydroxyalkyl cellulose and glyoxal.

Accordingly, our invention consists in a process for the purification of crude hydroxyalkyl cellulose containing water-soluble salts which comprises reacting the hydroxyalkyl cellulose suspended in a liquid medium under acid conditions with glyoxal at elevated temperature and thereafter washing it with water at acid pH. Advantageously the crude hydroxyalkyl cellulose is prepared by reacting cellulose in suspension in said liquid medium with alkylene oxide or a monochloro derivative thereof in presence of alkali and is reacted with glyoxal before separating from the suspending liquid. If desired, however, the crude hydroxyalkyl cellulose may be separated from the reaction liquor and resuspended in a further quantity of substantially anhydrous liquid. The process of our invention is especially advantageous for the preparation and purification of hydroxyethyl cellulose which may be prepared by reaction of cellulose with ethylene oxide or ethylene chlorohydrin in presence of an alkali.

Preferably the reaction of the hydroxyalkyl cellulose with glyoxal should be carried out at a temperature in the range 40 to 80° C. and it is preferred to use glyoxal in an amount not less than 2.5% by weight of the hydroxyalkyl cellulose. The preferred pH of the liquid medium for the reaction of the hydroxyalkyl cellulose with glyoxal is in the range 2–4.5. The optimum reaction time varies with the temperature but reaction times of 30 minutes are adequate for reaction temperatures of about 50° C.

The glyoxal-treated hydroxyalkyl cellulose may conveniently be separated from the suspending liquid in a filter or centrifuge and washed with neutral water, the residual acid in the hydroxyalkyl cellulose being sufficient to keep it sufficiently acid to prevent its dissolution. The temperature of the wash water should preferably be in the range 5–30° C.

The liquid medium in which the hydroxyalkyl cellulose is treated conveniently comprises isopropyl alcohol or acetone and it is conveniently acidified by hydrochloric or nitric acid which may be provided as excess acid used to neutralise the alkali present during the etherification of the cellulose.

The invention is further illustrated by the following examples in which all parts and percentages are by weight.

EXAMPLE 1

30 parts of air dry powdered woodpulp containing 90% alpha-cellulose were suspended in 450 parts of isopropyl alcohol/water azeotrope containing 87.7% of isopropyl alcohol. 10 parts of solid sodium hydroxide were added and the mixture stirred at room temperature for 15 minutes.

36.5 parts of ethylene oxide were added and the temperature raised to 60° C. during one hour and maintained for a further 4½ hours.

The reaction mixture was cooled to 50° C. and the pH adjusted to 2.5 by addition of 29.6 parts hydrochloric acid. 12 parts of 30% aqueous solution of glyoxal were then added and the stirring continued at 50° C. for 30 minutes. The mixture was allowed to stand at room temperature for 17 hours, then filtered and the solid washed on the filter with 3000 parts of tap water at 20° C. The isolated solid was dried in a current of air at 65–70° C. 30 parts of white granular hydroxyethyl cellulose having a hydroxyethoxyl content of 47.0% were obtained. The product had a sulphated ash of 1.0%, its viscosity in 2% aqueous solution was 13 centipoises and its time of solution in unbuffered distilled water was 2 hours 40 minutes.

EXAMPLE 2

Crude hydroxyethyl cellulose was prepared and acidified as described in Example 1 and 24 parts of 30% aqueous solution of glyoxal were added. The mixture was stirred at 50° C. for 30 minutes then cooled and isolated on a filter. The solid was washed on the filter with 1500 parts of water at 20° C. and dried in a hot air stream at 65–70° C. The product had a hydroxyethoxyl content of 45%, sulphated ash of 3.1% and a solution time of 2 hours 30 minutes in distilled water.

EXAMPLE 3

Crude hydroxyethyl cellulose was prepared as described in Example 1 and the reaction mixture was acidified by addition of 25.8 parts of 60% nitric acid and isolated by filtration. The solvent-wet filtered solid was added to a mixture of 400 parts of 87.7% aqueous isopropyl alcohol and 30 parts of 30% aqueous glyoxal, and dispersed by stirring. The mixture had a pH of 3.5 and was heated at 50° C. for 30 minutes, filtered and the solid washed on the filter with 2× 160 parts of 87.7% isopropyl alcohol followed by 1500 parts of water at 20° C. The solid was dried in a hot air stream at 60–65° C.

The isopropyl alcohol filtrate and washings from the glyoxal treatment contained 73.5% of the original quantity of glyoxal added.

The purified product had a sulphated ash of 1.0%. The time of solution was 4 hours 30 minutes in distilled water of pH 4.1, 2 hours 30 minutes when the pH was adjusted to 7.4 and 1 hour 10 minutes in 0.2% sodium bicarbonate solution.

EXAMPLE 4

30 parts of air dry woodpulp sheet were shredded in water and isolated on a centrifuge to give 58 parts of waterwet pulp. The wet pulp was suspended to form a slurry in 500 parts of 93.5% aqueous isopropyl alcohol and 10 parts sodium hydroxide added. 36.5 parts of ethylene oxide were added and the reaction mixture heated to 60° C. during one hour, maintained at this temperature for 4½ hours and cooled to 50° C. The mixture was acidified to pH 1.5 by the addition of 29.6 parts of 32% hydrochloric acid, 24 parts of 30% aqueous glyoxal were added and the mixture was stirred at 50° C. for a further 30 minutes. The slurry was cooled, filtered and washed on the filter with 1500 parts of water at 20° C. and dried at 60–80° C. in a hot air stream. The product had a hydroxyethoxyl content of 45%, a sulphated ash of 2.8% and a solution time in distilled water of 3 hours.

EXAMPLE 5

10 parts of sodium hydroxide dissolved in 56 parts of water were added to a suspension of 30 parts of powdered woodpulp in 400 parts of acetone. The resulting slurry was stirred for 15 minutes at 20° C. and 36.5 parts of ethylene oxide were added. The temperature was raised to 56–58° C. during one hour and maintained at this temperature for a further 4½ hours. After cooling to 50° C. the suspension was acidified to pH 3 by addition of 34.8 parts of 32% hydrochloric acid. 6 parts of 30% aqueous solution of glyoxal were added and heating continued at 50° C. for 30 minutes, and the mixture was allowed to stand for 17 hours at room temperature. The product was isolated by filtration, washed on the filter with 1500 parts of water at 20° C. and dried in a current of hot air at 60–80° C.

The product had a hydroxyethoxyl content of 54% and a sulphated ash of 8.0%.

EXAMPLE 6

55 parts of wet distintegrated woodpulp prepared from 30 parts air dry pulp sheet as described in Example 4 were suspended to form a slurry in 500 parts acetone. 10 parts of sodium hydroxide in 31 parts water were added and the slurry stirred at room temperature for 15 minutes. 36.5 parts of ethylene oxide in 16 parts acetone were added and the temperature raised to 56–58° C. during one hour and held at this temperature for 4½ hours before cooling to 50° C. The reaction mixture was acidified by the addition of 26.6 parts of 60% nitric acid and the solid was isolated. The wet solid was slurried in a mixture containing 320 parts acetone at pH 3.5 and 6 parts of 30% aqueous glyoxal solution. The mixture was stirred at 50° C. for 30 minutes and then cooled. The solid was isolated, washed on the centrifuge with 1500 parts of water at 40° C. and then dried at 70° C. The product had a hydroxyethoxyl content of 45% and a sulphated ash of 0.7%.

EXAMPLE 7

Hydroxyethyl cellulose was prepared, acidified and treated with glyoxal as described in Example 6 except that the quantity of glyoxal used was only 2.5 parts of 30% aqueous glyoxal solution and only 240 parts of acetone were used.

The product after washing with 1500 parts of water at 40° C. had a sulphated ash of 1.3%.

EXAMPLE 8

Hydroxyethyl cellulose was prepared, acidified and treated with 6 parts of 30% glyoxal solution at pH 3.5 as described in Example 6. The solid obtained after the glyoxal treatment was washed and dried in a current of air at 65° C. The purified hydroxyethyl cellulose obtained had a sulphated ash of 0.4%.

What I claim is:

1. A process for the purification of crude hydroxyl cellulose containing water-soluble salts consisting essentially of the steps of treating the hydroxyalkyl cellulose suspended in an acidified liquid having a pH of 1.5 to 4.5 in which the hydroxyalkyl cellulose is insoluble with an aqueous solution of glyoxal, containing not less than 2.5% by weight glyoxal based on the weight of hydroxyalkyl cellulose, at elevated temperature and thereafter washing the hydroxyalkyl cellulose, while it is still at acid pH, with water.

2. A process as claimed in claim 1 wherein the crude hydroxyalkyl cellulose is prepared by reacting cellulose in suspension in said liquid medium with alkylene oxide or a monochloro derivative thereof in presence of alkali.

3. A process as claimed in claim 1 wherein the hydroxyalkyl cellulose comprises hydroxyethyl cellulose.

4. A process as claimed in claim 1 wherein the hydroxyalkyl cellulose is reacted with glyoxal at a temperature in the range 40 to 80° C.

5. A process as claimed in claim 1 wherein the glyoxal-treated hydroxyalkyl cellulose is separated from the suspending liquid and washed with neutral water.

6. A process as claimed in claim 5 wherein the temperature of the wash water is in the range 5 to 30° C.

7. A process as claimed in claim 1 wherein the liquid medium comprises isopropyl alcohol or acetone.

8. A process as claimed in claim 1 wherein the acidified liquid is acidified with hydrochloric or nitric acid.

References Cited

UNITED STATES PATENTS 3,347,847   10/1967   Engelskirchen et al. __ 260—232

DONALD E. CZAJA, Primary Examiner

R. W. GRIFFIN, Assistant Examiner

U.S. Cl. X.R.

106—197, 198